(12) United States Patent
Lee et al.

(10) Patent No.: US 9,809,985 B2
(45) Date of Patent: Nov. 7, 2017

(54) FLOORING MATERIAL AND THE METHOD FOR THE SAME

(71) Applicant: LG Hausys, Ltd., Seoul (KR)

(72) Inventors: Ju Hyung Lee, Uiwang-si (KR); Sam Hun Yun, Anyang-si (KR); Myung Seok Park, Seoul (KR); Seong Moon Jung, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 693 days.

(21) Appl. No.: 14/240,867

(22) PCT Filed: Feb. 6, 2014

(86) PCT No.: PCT/KR2014/001032
§ 371 (c)(1),
(2) Date: Feb. 25, 2014

(87) PCT Pub. No.: WO2015/111784
PCT Pub. Date: Jul. 30, 2015

(65) Prior Publication Data
US 2016/0258168 A1 Sep. 8, 2016

(30) Foreign Application Priority Data

Jan. 27, 2014 (KR) ........................ 10-2014-0009610

(51) Int. Cl.
*E04F 15/16* (2006.01)
*C08J 5/04* (2006.01)
(Continued)

(52) U.S. Cl.
CPC ............... *E04F 15/16* (2013.01); *C08J 3/203* (2013.01); *C08J 5/047* (2013.01); *C08K 5/12* (2013.01);
(Continued)

(58) Field of Classification Search
CPC ........ E04F 15/16; C08J 5/047; C08J 2477/06; C08J 2327/06
See application file for complete search history.

(56) References Cited

U.S. PATENT DOCUMENTS 7,029,750 B2 * 4/2006 Takei ..................... C08F 14/26
428/323
7,354,656 B2 4/2008 Mohanty et al.
(Continued)

FOREIGN PATENT DOCUMENTS

JP 658037 U 8/1994
JP 0684675 B2 10/1994
(Continued)

OTHER PUBLICATIONS

Korean Notice of Allowance dated Oct. 21, 2014.
Supplementary European Search Report dated Jan. 24, 2017 for EP14705465.4.

*Primary Examiner* — Nathan Van Sell
(74) *Attorney, Agent, or Firm* — Hauptman Ham, LLP

(57) ABSTRACT

Disclosed herein is a flooring material including: a plasticizer; fibers comprising at least one type of inorganic fibers or at least one type of organic fibers; and a thermoplastic resin. The fibers have an alignment. In addition, a method for manufacturing a flooring material is also disclosed. The method includes preparing a first mixture by mixing a liquid plasticizer with fibers comprising at least one type of inorganic fibers or at least one type of organic fibers; preparing a second mixture in which the fibers are dispersed in the liquid plasticizer by agitating the first mixture; preparing a third mixture by mixing the second mixture with a thermoplastic resin; and forming a floor material through thermocompression of the third mixture.

11 Claims, 5 Drawing Sheets

(51) Int. Cl.
*C08J 3/20* (2006.01)
*C08K 5/12* (2006.01)
*C08K 7/04* (2006.01)

(52) U.S. Cl.
CPC ............. *C08K 7/04* (2013.01); *C08J 2327/06* (2013.01); *C08J 2477/06* (2013.01); *C08K 2201/003* (2013.01); *C08K 2201/004* (2013.01)

(56) References Cited

U.S. PATENT DOCUMENTS

| | | | | |
|---|---|---|---|---|
| 2002/0061941 | A1* | 5/2002 | Masamune | C08G 59/3218 523/404 |
| 2005/0014003 | A1* | 1/2005 | Takei | C08F 14/26 428/407 |
| 2005/0192382 | A1 | 9/2005 | Maine et al. | |
| 2006/0179733 | A1* | 8/2006 | Padmanabhan | B32B 21/08 52/177 |
| 2006/0189759 | A1* | 8/2006 | Walther | C08L 23/0815 525/192 |
| 2007/0141335 | A1* | 6/2007 | Perera | D02G 3/404 428/375 |
| 2011/0020572 | A1* | 1/2011 | Malek | B32B 27/08 428/35.7 |
| 2012/0232211 | A1* | 9/2012 | Vos | B32B 5/26 524/537 |

FOREIGN PATENT DOCUMENTS

| | | |
|---|---|---|
| JP | 2000297495 A | 10/2000 |
| JP | 2000297496 A | 10/2000 |
| KR | 100614754 B1 | 8/2006 |
| KR | 20120105135 A | 9/2012 |
| KR | 10-2013-0129626 A | 11/2013 |

* cited by examiner

FLOORING MATERIAL AND THE METHOD FOR THE SAME

TECHNICAL FIELD

The present invention relates to a flooring material and a method for manufacturing the same.

BACKGROUND ART

Flooring materials based on thermoplastic resins such as polyvinyl chloride (PVC) have been used for buildings, such as houses, offices, and the like. Flooring materials formed of polyvinyl chloride have low heat resistance and thus can suffer from severe contraction when heated, for example, when used with an under-floor heating system. To prevent this problem, in general, a glass fibers sheet or glass fiber scrim may be separately prepared and stacked thereon, or additives for preventing contraction may beadded thereto. Recently, to achieve widespread application of thermoplastic resins having good processability, various attempts have been made to prevent contraction of the thermoplastic resins while securing economic feasibility and improving mechanical properties.

DISCLOSURE

Technical Problem

It is an aspect of the present invention to provide a flooring material which exhibits excellent heat resistance and dimensional stability, has good strength and is applicable to various fields.

It is another aspect of the present invention to provide a method for manufacturing a flooring material, which can reduce a process defect rate, manufacturing costs, and processing time.

Technical Solution

In accordance with one aspect of the present invention, a flooring material includes: a plasticizer; fibers comprising at least one type of inorganic fibers or at least one type of organic fibers; and a thermoplastic resin, wherein the fibers have an alignment.

The plasticizer and the fibers may have polarity.

The plasticizer may be present in an amount of 20 parts by weight to 30 parts by weight based on 100 parts by weight of the thermoplastic resin.

The fibers may be present in an amount of 0.1 parts by weight to 10 parts by weight based on 100 parts by weight of the thermoplastic resin.

The thermoplastic resin may include at least one selected from the group consisting of polyvinyl chloride (PVC), polyvinylidene chloride (PVDC), polyvinylidene fluoride (PVF), chlorinated polyvinyl chloride (CPVC), polyvinyl alcohol (PVA), polyvinyl acetate (PVAc), polyvinyl butyrate (PVB), polyethylene (PE), polypropylene (PP), and combinations thereof.

The plasticizer may include at least one selected from the group consisting of diisononylphthalate (DINP), dioctyl terephthalate (DOTP), dioctylphthalate (DOP), dioctyladipate (DOA), and combinations thereof.

The inorganic fibers may include glass fibers or ceramic fibers.

The inorganic fibers may have a diameter of about 2 μm to about 6 μm.

The inorganic fibers may have a length of about 1 mm to about 3 mm.

The organic fibers may include at least one selected from the group consisting of aromatic polyamide fibers, nylon fibers, polypropylene (PP) fibers, and combinations thereof.

The organic fibers may have a diameter of about 2 μm to about 20 μm.

The organic fibers may have a length of about 3 mm to about 50 mm.

The flooring material may further comprise fillers.

The fillers may be present in an amount of about 100 parts by weight to about 600 parts by weight based on 100 parts by weight of the thermoplastic resin.

The fillers may include at least one selected from the group consisting of calcium carbonate, talc, fly ash, blast-furnace slag, and combinations thereof.

The flooring material may have a thickness of about 2 mm to about 7 mm.

In accordance with one aspect of the present invention, a method for manufacturing a flooring material includes: preparing a first mixture by mixing a liquid plasticizer with fibers comprising at least one type of inorganic fibers or at least one type of organic fibers; preparing a second mixture in which the fibers are dispersed in the liquid plasticizer by agitating the first mixture; preparing a third mixture by mixing the second mixture with a thermoplastic resin; and forming a floor material through thermo-compression of the third mixture.

The liquid plasticizer and the fibers may have polarity

The first mixture may be agitated at a speed of about 5 rpm to about 100 rpm.

Thermo-compression of the third mixture may be performed such that the fibers have an alignment

Advantageous Effects

According to the present invention, the flooring material has good strength, exhibits excellent properties in terms of heat resistance and dimensional stability, and may be used in various ways as adhesive or non-adhesive type flooring materials.

According to the present invention, the method for manufacturing a flooring material may reduce a process defect rate, manufacturing costs, and processing time, while improving dimensional stability of the flooring material.

BEST MODE

Hereinafter, embodiments of the present invention will be described in detail such that the embodiments can be easily realized by a person having ordinary knowledge in the art. However, it should be understood that the following embodiments are provided for illustration only and are not to be construed in any way as limiting the present invention. The scope of the present invention is defined only by the claims.

Flooring Material

One embodiment of the invention provides a flooring material that includes a plasticizer; fibers comprising at least one type of inorganic fibers or at least one type of organic fibers; and a thermoplastic resin, wherein the fibers have an alignment.

Flooring materials are generally manufactured using a thermoplastic resin having excellent processability. However, most thermoplastic resins have low heat resistance and are likely to suffer from signification contraction when heated, for example, when used with an under-floor heating system, thereby limiting utilization of the flooring materials. To prevent this problem, a large amount of additive for preventing contraction is generally added. However, this method is inefficient due to deterioration in workability and tensile load. In another method, a separate sheet or scrim is prepared and stacked on one side of the flooring material to prevent contraction. The sheet or scrim may be formed of, for example, glass fibers or the like. In this case, the manufacturing process requires a separate laminating machine, thereby increasing manufacturing costs and causing a high defect rate.

In order to prevent contraction without a separate lamination process, one embodiment of the present invention provides a flooring material that includes a plasticizer; fibers comprising at least one type of inorganic fibers or at least one type of organic fibers; and a thermoplastic resin, in which the fibers have an alignment.

Figure 1:
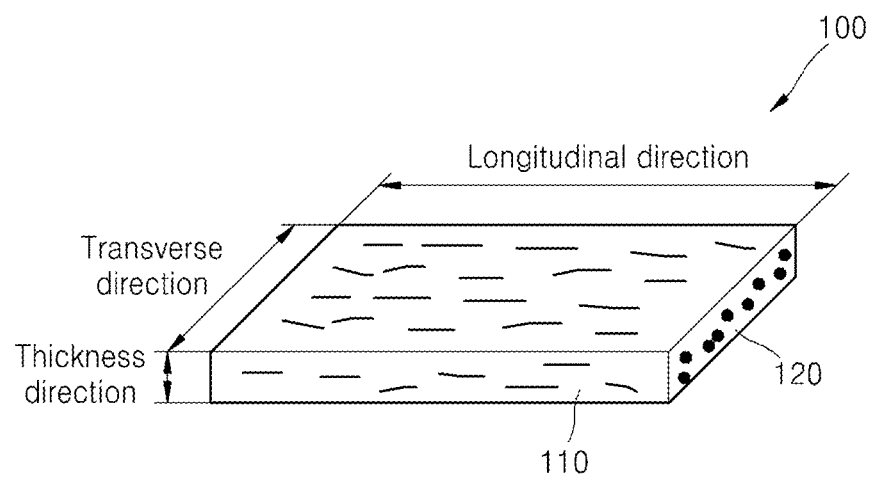
FIG. 1 schematically shows a flooring material according to one embodiment of the present invention.

FIG. 1 schematically shows a flooring material according to one embodiment of the present invention, which is fractured to a predetermined size.

Referring to FIG. 1, in the flooring material cut to a predetermined size, one direction of the flooring material may be defined as a longitudinal direction and a direction perpendicular to the longitudinal direction may be defined as a transverse direction. Here, FIG. 1 schematically shows the flooring material as one example of the present invention, in which the fibers have an alignment in the longitudinal direction.

Figure 2A:
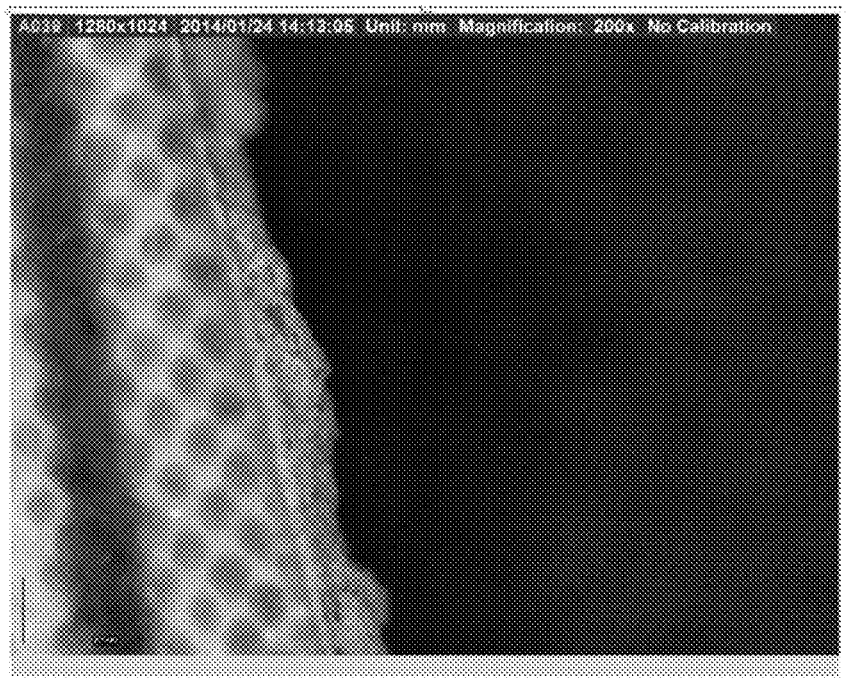
FIG. 2(a) is a picture showing a fracture surface of the flooring material taken in a longitudinal direction.
Figure 2B:
FIG. 2(b) is a picture showing a fracture surface of the flooring material taken in a transverse direction.
Figure 3A:
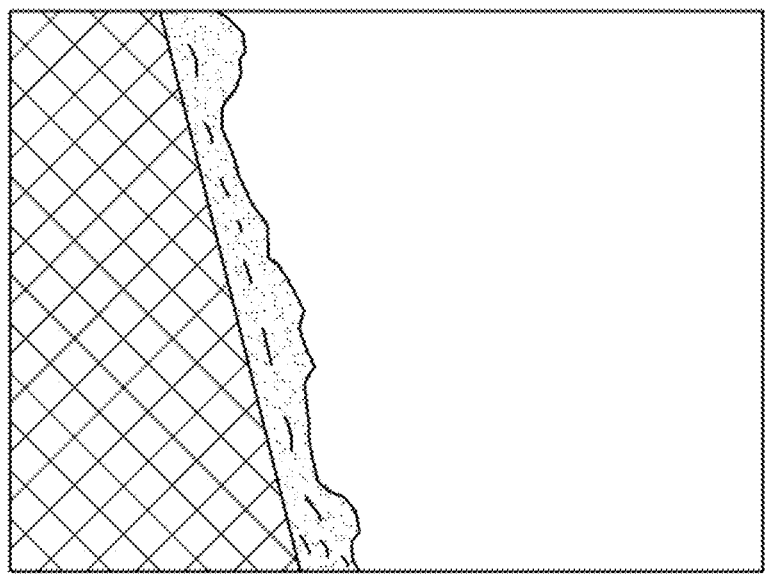
FIG. 3(a) is a view schematizing (a) of FIG. 2.
Figure 3B:
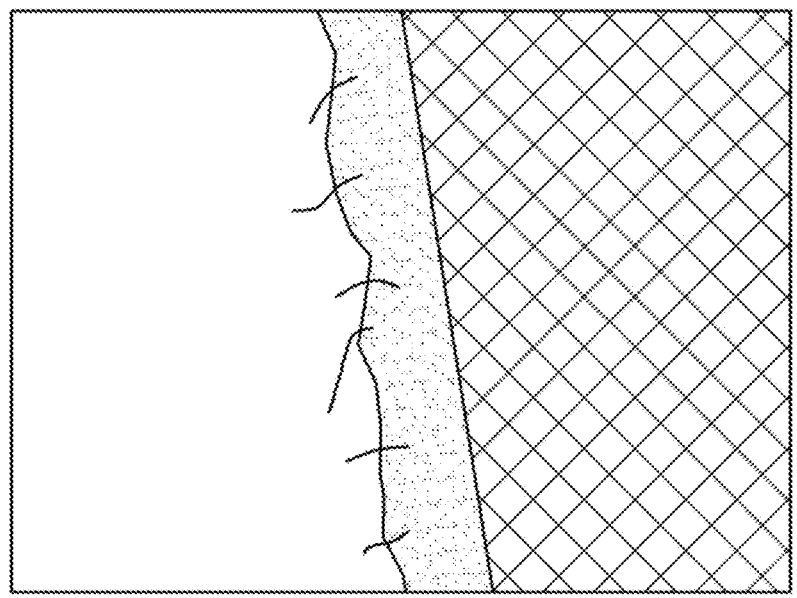
FIG. 3(b) is a view schematizing (b) of FIG. 2.

With regard to the flooring material shown in FIG. 1, pictures of FIG. 2 show a fracture surface 110 taken in the longitudinal direction and a fracture surface 120 taken in the transverse direction. Specifically, (a) of FIG. 2 is a picture of the fracture surface 110, which was photographed while looking down the flooring material in a thickness direction after fracturing the flooring material in the longitudinal direction and (b) is a picture of the fracture surface 120, which was photographed while looking down the flooring material in the thickness direction after fracturing the flooring material in the transverse direction FIGS. 3(a) and 3(b) are views schematizing (a) and (b) of FIG. 2, respectively.

The expression "the fibers have an alignment" means that the fibers are aligned in a certain direction, instead of meaning that all of the fibers are parallel to each other.

In addition, referring to FIGS. 1 to 3, the expression "the fibers have an alignment in the longitudinal direction" may mean that the number of fibers per unit area of the fracture surface 120 in the transverse direction is greater than the number of fibers per unit area of the fracture surface 110 in the longitudinal direction.

Referring to FIGS. 1 to 3, since the fibers of FIG. 1 are aligned in the longitudinal direction, the fibers do not protrude from the fracture surface 110 in the longitudinal direction, as shown in FIG. 2(a).

Since the fibers are aligned in the longitudinal direction, cut ends of the fibers protrude from the fracture surface 120 in the transverse direction. That is, it can be seen that the fibers protrude from the fracture surface 120 in the transverse direction, unlike the fibers shown in FIG. 2(a).

That is, from difference in shape of the fracture surface between (a) and (b) of FIG. 2, it can be seen that the flooring material of FIG. 1 contains the fibers, which are aligned in the longitudinal direction.

As such, since the fibers have an alignment, it is possible to improve dimensional stability, heat resistance and durability of the flooring material. As a result, application range of the flooring material can be extended.

The flooring material includes the plasticizer and the fibers. There are two types of interaction between the plasticizer and the fibers, that is, polarity-polarity interaction and polarity-nonpolarity interaction.

Specifically, the plasticizer and the fibers may have polarity. Polarity-polarity interaction is more effective in mixing and dispersion than polarity-nonpolarity interaction. For example, when the flooring material contains polar fibers and a polar plasticizer, polarity-polarity interaction between the fibers and the plasticizer allows the fibers to be more stably and uniformly dispersed in the flooring material, thereby improving durability of the flooring material.

Specifically, the flooring material may include about 20 parts by weight to about 30 parts by weight of the plasticizer based on 100 parts by weight of the thermoplastic resin. If the amount of the plasticizer is less than about 20 parts by weight, the flooring material requires a long processing time. If the amount of the plasticizer exceeds about 30 parts by weight, the flooring material can be deteriorated in tensile load.

In addition, the flooring material may include about 0.1 parts by weight to about 10 parts by weight of the fibers based on 100 parts by weight of the thermoplastic resin. If the amount of the fibers is less than about 0.1 parts by weight, it is difficult to improve heat resistance and tensile load of the flooring material. If the amount of the fibers exceeds about 10 parts by weight, the flooring material can be deteriorated in processability.

The thermoplastic resin may include at least one selected from the group consisting of polyvinyl chloride (PVC), polyvinylidene chloride (PVDC), polyvinylidene fluoride (PVF), chlorinated polyvinyl chloride (CPVC), polyvinylalcohol (PVA), polyvinylacetate (PVAc), polyvinylbutyrate (PVB), polyethylene (PE), polypropylene (PP), and combinations thereof.

Specifically, the thermoplastic resin may be polyvinyl chloride (PVC), or a resin wherein polyvinyl chloride (PVC) and polyvinylbutyrate (PVB) are mixed. Polyvinyl chloride (PVC) exhibits excellent processability and low heat resistance. Thus, when PVC is contained in the thermoplastic resin of the flooring material, dimensional stability of the flooring material can be optimally improved, and when PVC is contained together with the plasticizer and the fibers, the flooring material has improved tensile load and impact strength.

The plasticizer is a liquid solvent of low volatility, facilitates processing by softening the thermoplastic resin, and imparts flexibility to the flooring material. In addition, the plasticizer improves durability and dimensional stability of the flooring material at high temperature through good compatibility with the fibers.

Specifically, the plasticizer may include at least one selected from the group consisting of diisononylphthalate (DINP), dioctylphthalate (DOP), dioctyl terephthalate (DOTP) which is a non-phthalate compound, dioctyladipate (DOA), which is an aliphatic dibasic acid ester, and combinations thereof.

For example, the plasticizer may be dioctylphthalate (DOP) or dioctyl terephthalate (DOTP). In this case, the plasticizer has good polarity to improve dispersion of the polar fibers, thereby improving tensile load of the flooring material while securing good dimensional stability thereof.

The at least one type of inorganic fibers may include glass fibers or ceramic fibers. Specifically, the inorganic fibers may be glass fibers and, in this case, the glass fibers may have a suitable diameter and length. When the glass fibers have a suitable diameter and length, it is possible to improve dispersion of the plasticizer in manufacture of the flooring material, whereby the plasticizer can be uniformly dispersed in the flooring material, thereby improving durability and dimensional stability.

Specifically, the inorganic fibers may have a diameter of about 2 μm to about 6 μm. If the diameter of the inorganic fibers is within this range, it is possible to improve dispersion of the plasticizer in manufacture of the flooring material, whereby the plasticizer can be uniformly dispersed throughout the flooring material, thereby improving durability and dimensional stability.

In addition, the polar inorganic fibers may have a length of about 1 mm to about 3 mm. If the length of the inorganic fibers is within this range, it is possible to improve dispersion of the plasticizer in manufacture of the flooring material, whereby the plasticizer can be uniformly dispersed throughout the flooring material, thereby improving durability and dimensional stability.

The at least one type of organic fibers may include at least one selected from the group consisting of aromatic polyamide fibers, nylon fibers, polypropylene (PP) fibers, and combinations thereof. Specifically, the organic fibers may include aromatic polyamide fibers, that is, aramid fibers.

If the organic fibers include aramid fibers, dispersion stability of the polar plasticizer can be improved, and the flooring material have improved cost effective physical properties in terms of mechanical strength, the dimensional stability, and the like.

More specifically, the organic fibers may include aramid fibers, and, when aramid fibers are dispersed in the polar plasticizer, such as dioctylphthalate (DOP) or dioctyl terephthalate (DOTP), dispersion is optimized since the aramid fibers have a similar specific gravity to that of the polar plasticizer, whereby the flooring material has excellent dimensional stability and durability.

The organic fibers are added to the flooring material to improve dimensional stability and physical properties such as durability, and the like. The organic fibers may have a diameter of about 2 μm to about 20 μm. If the diameter of the polar organic fibers is less than about 2 μm, it is difficult to improve dimensional stability even though the flooring material includes the fibers. If the diameter of the polar organic fibers is longer than about 20 μm, the organic fibers cannot be uniformly dispersed in the plasticizer in manufacture of the flooring material, thereby deteriorating processability.

In addition, the organic fibers may have a length of about 3 mm to about 50 mm. If the length of the organic fibers is less than about 3 mm, it is difficult to improve dimensional stability. If the length of the organic fibers is longer than about 50 mm, the organic fibers cannot be uniformly dispersed in the polar plasticizer and can be entangled in manufacture of the flooring material, thereby deteriorating durability and strength of the flooring material.

The fibers may include at least one type of organic fibers, or at least one type of inorganic fibers, or may include a mixture thereof. Specifically, the fibers may include at least one type of organic fibers. For example, when the fibers include aramid fibers, the flooring material may have good thermal stability at high temperature, and have improved dimensional stability and durability.

The flooring material may further include fillers to improve product strength, heat resistance and durability while reducing manufacturing costs. The fillers may include at least one selected from the group consisting of calcium carbonate, talc, fly ash, blast-furnace slag, and combinations thereof. The fillers may have isotropy. In this case, particles having a proper size may be selectively used in consideration of both economic feasibility and improvement in physical properties. Specifically, the flooring material may include calcium carbonate as the fillers in terms of price and versatility.

In addition, when the flooring material contains calcium carbonate, not only does calcium carbonate improve heat resistance and durability, but also contributes to improvement in dimensional stability and tensile load of the flooring material that contains the thermoplastic resin and the fibers.

When the flooring material includes the fillers, the fillers may be present in an amount of about 100 parts by weight to about 600 parts by weight, for example, about 200 parts by weight to about 400 parts by weight, based on 100 parts by weight of the thermoplastic resin. If the amount of the fillers is within this range, the flooring material can exhibit good cost-effective processability.

For example, in the flooring material, calcium carbonate may be present in amount of about 100 parts by weight to about 600 parts by weight based on 100 parts by weight of the thermoplastic resin. In this case, the calcium carbonate provides good cost-effective processability and is advantageous in terms of interaction with the fibers to improve dimensional stability of the flooring material.

The flooring material may include at least one an additive selected from the group consisting of heat stabilizers, lubricants, processing aids, reinforcing agents, colorants, and combinations thereof, as needed.

The flooring material may further include about 0.3 parts by weight to about 10 parts by weight of the additive based on 100 parts by weight of the thermoplastic resin. If the amount of the additive is within this range, the additive can provide advantages in terms of effects thereof and economic feasibility.

Specifically, the heat stabilizer serves to prevent the thermoplastic resin from being changed in original properties as the thermoplastic resin is decomposed and aged by oxygen in air, light, thermal energy, etc. Specifically, the heat stabilizer may include at least one selected from the group consisting of Ba/Zn, Ca/Zn, Tin, lead stearic acid, and combinations thereof. For example, the flooring material may include Ba/Zn-stearic acid as the heat stabilizer. In this case, the flooring material can have good viscosity and thermal stability.

The lubricant facilitates flow of the thermoplastic resin and mold separation upon processing of the thermoplastic resin. Specifically, the flooring material may include lubricants such as stearic acid or rosin. In this case, the lubricants reduce temperature and time for processing the flooring material, while improving workability in manufacture of the flooring material.

The processing aids are added to improve processability and formability of the flooring material, and may include, for example, methyl methacrylate (MMA). Methyl methacrylate may have a weight-average molecular weight of about 100,000 to about 3,000,000. When the flooring material includes the processing aids, it is possible to shorten melting time in a manufacturing process and to improve melting strength. In addition, the processing aids may be used to achieve uniform mixing of components for the flooring material while improving mechanical and physical properties of the flooring material.

The reinforcing agent improves mechanical strength of the flooring material, and may representatively include at least one selected from the group consisting of transparent methyl methacrylate-butadiene-styrene (MBS), opaque methyl methacrylate-butadiene-styrene (MBS), acrylonitrile-butadiene-styrene (ABS), and combinations thereof. For example, the flooring material may include opaque methyl methacrylate-butadiene-styrene (MBS) as the reinforcing agent, which advantageously improves impact strength of the flooring material.

The colorants refer to dyes or pigments that are added to impart color in order to improve aesthetic appearance and practical effects as needed. The flooring material may include various dyes or pigments, and a mixture thereof as needed.

The flooring material may have a thickness from about 2 mm to about 7 mm, for example, from about 2 mm to about 4 mm. A conventional flooring material is manufactured by stacking a separate scrim or the like, or is relatively thickly manufactured so as to have proper strength and durability, thereby causing increase in manufacturing costs, deterioration in processability and mobility, and the like. Conversely, the flooring material according to the present invention includes a plasticizer and fibers, which have an alignment, thereby achieving good resistance, durability, and dimensional stability even within the aforementioned thickness range, and enabling application not only to adhesive type flooring materials using adhesives or the like, but also to non-adhesive type flooring materials using fastening members or the like.

For example, the flooring material may have a thickness of about 2 mm to about 3 mm, and has good tensile strength and dimensional stability due to the composition thereof, thereby enabling application not only to adhesive type flooring materials but also to non-adhesive type flooring materials within the aforementioned thickness range, while improving processability.

Method for Manufacturing Flooring Material

According to another embodiment, a method for manufacturing a flooring material includes: preparing a first mixture by mixing a liquid plasticizer with fibers comprising at least one type of inorganic fibers or at least one type of organic fibers; preparing a second mixture in which the fibers are dispersed in the liquid plasticizer by agitating the first mixture; preparing a third mixture by mixing the second mixture with a thermoplastic resin; and forming a floor material through thermo-compression of the third mixture.

A conventional flooring material is prevented from contraction by manufacturing and stacking a separate sheet or scrim on a thermoplastic resin layer. The sheet or scrim may be formed of, for example, glass fibers or the like. In this case, the manufacturing process requires a separate laminating machine, thereby increasing manufacturing costs and defect rate.

Thus, the method for manufacturing a flooring material according to the embodiment secures dimensional stability by mixing the flooring material with the fibers without any separate laminating process, and may include preparing a first mixture and preparing a second mixture. Specifically, the method includes preparing the first mixture by mixing the liquid plasticizer with the fibers, and preparing the second mixture by agitating the first mixture to disperse the fibers in the liquid plasticizer.

In this way, the fibers are first mixed and dispersed in the liquid plasticizer, whereby the fibers can be uniformly dispersed in the flooring material without any separate laminating process, thereby reducing manufacturing costs and process defect rate while improving durability and dimensional stability of the flooring material.

In the method for manufacturing a flooring material, the liquid plasticizer and the fibers may have polarity. As described above, there may be two types of interaction between the plasticizer and the fibers, namely, polarity-polarity interaction and polarity-nonpolarity interaction. Polarity-polarity interaction is more effective in mixture and dispersion than polarity-nonpolarity interaction. Thus, when the polar fibers are dispersed in the polar plasticizer, polarity-polarity interaction allows the fibers to be more stably and uniformly dispersed in the flooring material, thereby improving durability and dimensional stability of the flooring material.

Specifically, when the polar fibers are dispersed in the polar plasticizer, it is more effective than the case where the nonpolar fibers are dispersed in the polar plasticizer, the flooring material can provide excellent processability and have improved physical properties in terms of durability, heat resistance, and the like.

For example, the plasticizer having polarity may include dioctylphthalate (DOP) or dioctyl terephthalate (DOTP), and the fibers mixed therewith may include glass fibers or aramid fibers. In this case, a good dispersion effect can be achieved.

In addition, when the inorganic fibers and the organic fibers satisfy the aforementioned diameter and length ranges, it is possible to further improve dispersion of the liquid plasticizer in preparation of the second mixture. As a result, it is possible to improve durability and dimensional stability of the flooring material.

The method for manufacturing a flooring material includes preparing the first mixture, and preparing the second mixture, whereby the fibers can be first mixed with and dispersed in the liquid plasticizer. Thus, even when the fibers are used in the form of bulk or roll, the fibers can be uniformly disposed throughout the flooring material without any separate cutting process, thereby reducing manufacturing cost and time while achieving good durability and dimensional stability of the flooring material.

For example, in preparation of the first mixture, the fibers may be placed in bulk or roll form in the liquid plasticizer. Then, the fibers are preferentially mixed with and dispersed in the liquid plasticizer by operation of preparing the second mixture, whereby the fibers can be uniformly dispersed in the final flooring material while improving durability and dimensional stability of the flooring material.

Here, the term "bulk or roll form" means that inorganic or organic fibers having a predetermined length are aggregated to have a bulky or long string shape of a predetermined size. Although the inorganic fibers and the organic fibers are placed in bulk and roll form without any separate process, they can be uniformly dispersed throughout the flooring material, thereby simplifying manufacturing process while reducing manufacturing cost and time.

The method for manufacturing the flooring material includes preparing the second mixture, in which the first mixture is agitated to disperse the fibers in the liquid plasticizer.

In operation of preparing the second mixture, the first mixture may be agitated at a speed of about 5 rpm to about 100 rpm. If the rate is slower than about 5 rpm, the inorganic fibers or the organic fibers are not sufficiently dispersed in the liquid plasticizer. On the other hand, if the rate is faster than about 100 rpm, the fibers can be damaged during the manufacturing process, thereby making it difficult to improve strength and dimensional stability of the flooring material.

In practice, when the first mixture is agitated, at least one type of inorganic fibers or at least one type of organic fibers may be swollen in the liquid plasticizer and thus not well agitated. In this case, when the fibers are immersed in the liquid plasticizer for about 5 minutes or more and then agitated, the fibers can be uniformly dispersed within the agitating speed range.

The method may further include preparing a third mixture by mixing the second mixture with the thermoplastic resin. The thermoplastic resin is mixed with the second mixture in which the fibers are mixed with and dispersed in the liquid plasticizer, thereby preparing the third mixture. Thus, in the third mixture, the fibers are uniformly dispersed, whereby the flooring material can exhibit good durability and heat resistance.

Further, the third mixture may further include fillers to improve heat resistance and durability of the flooring material while reducing manufacturing costs. Here, the fillers are the same as mentioned above.

In addition, the third mixture may include at least one additive selected from the group consisting of heat stabilizers, lubricants, processing aids, reinforcing agents, colorants, and combinations thereof, as needed. Details of the additives and the kind thereof are the same as described above.

The method for manufacturing the flooring material may include forming the flooring material through thermo-compression of the third mixture. Here, the operation of forming the flooring material through thermo-compression of the third mixture may include thermo-compressing the fibers to have an alignment. Thermo-compression may be performed by pressing or calendering. For thermo-compression, calendering makes it easy to align the fibers in a certain direction and is advantageous for mass production of the flooring material.

Specifically, when the third mixture is subjected to thermo-compression by calendering to manufacture the flooring material, a withdrawal direction of the flooring material may be defined as the longitudinal direction and a direction perpendicular to the withdrawal direction may be defined as the transverse direction.

For example, the flooring material may be subjected to thermo-compression to be aligned in the longitudinal direction. In this case, it is possible to effectively improve dimensional stability and heat resistance of the flooring material in the longitudinal direction.

In this way, the flooring material includes the plasticizer; the fibers comprising at least one type of inorganic fibers or at least one type of organic fibers; and the thermoplastic resin, in which the fibers have an alignment so as to improve heat resistance and dimensional stability, thereby allowing various applications to adhesive and non-adhesive type flooring materials.

In addition, the flooring material manufactured by the method according to this embodiment has a decreased process defect rate, reduces manufacturing costs, and shortens manufacturing time. The flooring material manufactured by the method according to this embodiment has excellent dispersion effects that further improve durability and dimensional stability.

Next, the present invention will be described with reference to some examples. However, it should be understood that the following examples are provided for illustration only and are not to be construed in any way as limiting the present invention.

EXAMPLES AND COMPARATIVE EXAMPLES

Example 1

A liquid plasticizer (NEO-T, Aekyung) was prepared and mixed with fibers comprising aramid fibers (Kevlar, DuPont) in bulky form having a diameter of 10 μm and a length of 5 mm, thereby preparing a first mixture. Then, the first mixture was agitated for 10 minutes at a speed of 10 rpm to 50 rpm, thereby preparing a second mixture. Then, a PVC resin (LS100, LG Chemistry), calcium carbonate, and other additives were added to the second mixture, thereby preparing a third mixture. Then, the third mixture was thermo-compressed at 180° C. by calendering for 5 minutes, thereby manufacturing a flooring material. Here, the fibers were present in an amount of 0.5 parts by weight based on 100 parts by weight of the PVC resin, and were aligned in the withdrawal direction of the flooring material.

Example 2

A flooring material was manufactured in the same manner as in Example 1 except that fibers contained aramid fibers having a diameter of 10 μm and a length of 10 mm in bulky form.

Example 3

A flooring material was manufactured in the same manner as in Example 1 except that fibers contained aramid fibers (Kevlar, DuPont) having a diameter of 10 μm and a length of 5 mm in bulky form, and glass fibers having a diameter of 5 μm and a length of 3 mm in bulky form, in which a weight ratio of the aramid fibers to the glass fibers was 75:25.

Example 4

A flooring material was manufactured in the same manner as in Example 1 except that the third mixture did not include calcium carbonate.

Example 5

A flooring material was manufactured in the same manner as in Example 2 except that the third mixture did not include calcium carbonate.

Example 6

A PVC resin (LS100, LG Chemistry) was prepared and mixed with aramid fibers having a diameter of 10 μm and a length of 10 mm in bulky form. Then, a plasticizer (NEO-T, Aekyung), calcium carbonate, and other additives were added to and mixed with the PVC resin. Thereafter, thermo-compressing was performed at 180° C. for 5 minutes, thereby manufacturing a flooring material in which the aramid fibers are aligned in a withdrawal direction of the flooring material.

Comparative Example 1

A flooring material was manufactured in the same manner as in Example 1 except that the third mixture did not include fibers and includes a PVC resin (LS100 LG Chemistry), a liquid plasticizer (NEO-T, Aekyung), calcium carbonate, and other additives.

Comparative Example 2

A flooring material was manufactured in the same manner as in Example 2 except that the third mixture did not include calcium carbonate.

Comparative Example 3

Glass fiber scrim was prepared in a mesh form having a diameter of 14 μm and a hole interval of 4 mm. A composition including a PVC resin (LS100, LG Chemistry), a liquid plasticizer (NEO-T), calcium carbonate, and other additives was melt and thermo-compressed at 180° C. for 5 minutes, thereby manufacturing a sheet. Then, the glass fiber scrim was attached to one side of the sheet, thereby manufacturing a flooring material having a laminated structure.

Experimental Example

Experimental Example 1

Measurement of Tensile Load

The flooring materials prepared in Examples and Comparative Examples were cut to a size of 20 mm×150 mm×2 mm (width×length×height), and tensile load of each specimen was measured at a tensile speed of 200 mm/minusing a tensile tester (M350-5 kN, Testometric).

Experimental Example 2

Measurement of Dimensional Change Rate

In the flooring materials of Examples and Comparative Examples, a withdrawal direction of the flooring material was defined as a longitudinal direction, and the direction perpendicular thereto was defined as a transverse direction. Regarding the longitudinal direction as the length and the transverse direction as the width, specimens of the flooring materials each having a size of 225 mm×225 mm×2 mm (width×length×height) were prepared.

Next, an initial length and an initial width of each specimen were measured at room temperature. Thereafter, the specimen was kept at about 75° C. to 85° C. for 6 hours and kept again at about 20° C. to 25° C. (room temperature) for 2 hours, followed by measuring a final length and a final width of the specimen. Based on the initial and final dimensions, the dimensional change rates of the flooring materials were measured according to Equations 1 and 2 in the longitudinal direction and the transverse direction.

$$\text{Dimensional change rate (\%) in longitudinal direction} = \{(\text{final length} - \text{initial length})/\text{initial length}\} \times 100 \quad \text{[Equation 1]}$$

$$\text{Dimensional change rate (\%) in transverse direction} = \{(\text{final width} - \text{initial width})/\text{initial width}\} \times 100 \quad \text{[Equation 2]}$$

The components of Examples and Comparative Examples, and tensile load and dimensional change rate are shown in Table 1.

TABLE 1

| | Aramid fibers | Glass fibers | Calcium carbonate | Tensile load (kgf) | Dimensional change rate (%) Longitudinal direction | Dimensional change rate (%) Transverse direction |
|---|---|---|---|---|---|---|
| Example 1 | ○ (length 5 mm) | — | ○ | 38.69 | −0.01 | −0.04 |
| Example 2 | ○ (length 10 mm) | — | ○ | 41.99 | −0.06 | −0.07 |
| Example 3 | ○ (length 5 mm) | ○ (length 3 mm) | ○ | 42.01 | −0.07 | −0.08 |
| Example 4 | ○ (length 5 mm) | — | — | — | −0.31 | −0.32 |
| Example 5 | ○ (length 10 mm) | — | — | — | −0.31 | −0.21 |
| Example 6 | ○ (length 10 mm) | — | ○ | 39.11 | −0.07 | −0.08 |
| Comparative Examples 1 | — | — | ○ | 36.31 | −0.13 | −0.08 |
| Comparative Examples 2 | — | — | — | — | −0.85 | −0.88 |
| Comparative Examples 3 | — | ○ (scrim lamination) | ○ | 43.2 | −0.12 | −0.08 |

Referring to Table 1, the flooring materials of Examples 1 to 3 were manufactured by the method according to the invention and included the organic fibers or the inorganic fibers, whereas the flooring material of the Comparative Examples 1 did not include the organic fibers or the inorganic fibers. As such, these flooring materials had different components and were manufactured by different methods.

In this case, the flooring materials of Examples 1 to 3 had a tensile load from about 38 kgf to about 42 kgf, whereas the flooring material of the Comparative Examples 1 has a tensile load of 36.31 kgf. Therefore, it could be seen that the flooring materials of Examples 1 to 3 had increased tensile load and good durability by including the organic fibers or the inorganic fibers.

In addition, all of absolute values of the dimensional change rates of the flooring materials of Examples 1 to 3 were less than 0.1 or less in the longitudinal direction and the transverse direction, whereas the absolute value of the dimensional change rate of the Comparative Example 1 was greater than 0.1, particularly, in the longitudinal direction. Thus, it could be seen that the flooring materials of Examples 1 to 3 had better dimensional stability than that of Comparative Example 1.

Likewise, the flooring materials of Examples 4 and 5 were manufactured by the method according to the invention and included the organic fibers or the inorganic fibers, whereas the flooring materials of Comparative Example 2 did not include the organic fibers or the inorganic fibers. As such, these flooring materials had different components and were manufactured by different methods. All of absolute values of the dimensional change rates in the longitudinal direction and the transverse direction in the flooring materials of Examples 4 and 5 were in the range of 0.20 to 0.35, whereas the absolute value of the dimensional change rate in flooring materials of Comparative Example 2 was 0.85 or more. Therefore, it can be seen that the flooring materials of Examples 4 and 5 had further improved dimensional stability than that of Comparative Example 2.

The flooring materials of Examples 1 to 3 were manufactured by the method according to the invention and included the organic fibers or the inorganic fibers uniformly dispersed in the flooring material without any separate lamination process. On the other hand, the flooring material of Comparative Example 3 was manufactured by preparing a glass fiber scrim through a separate lamination process and attaching the scrim to the sheet including PVC. Thus, the flooring material of Comparative Example 3 was manufactured by a different method than Examples 1 to 3. Here, all of absolute values of the dimensional change rates of Examples 1 to 3 in the longitudinal direction and the transverse direction were 0.1 or less, whereas the absolute value of the dimensional change rate of the Comparative Example 3 was higher than 0.1, particularly, in the longitudinal direction. Therefore, it can be seen that the flooring materials of Examples 1 to 3 had better dimensional stability than that of Comparative Example 3.

In addition, the flooring material of the Example 3 was manufactured without any separate lamination process, thereby reducing manufacturing cost and time and a process defect rate as compared with Comparative Example 3.

The flooring material of Example 2 was manufactured by the method according to the invention, i.e. by primarily dispersing the organic fibers having a bulky form in the plasticizer such that the fibers could be uniformly dispersed in the flooring material. On the other hand, the flooring material of Example 6 was manufactured by cutting the organic fibers having the same physical properties as that of Example 2 and then directly mixing the fibers with PVC. Accordingly, these flooring materials were manufactured by different methods.

The flooring material of Example 2 had a tensile load of 41.99 kgf, whereas the flooring material of Example 6 has a tensile load of 39.11 kgf. Thus, it can be seen that the tensile load of Example 2 is about 10% higher than that of Example 6.

Although the flooring material of Example 6 had a lower tensile load smaller than that of Example 2, the flooring material of Example 6 exhibited higher tensile load than that of Comparative Example 1, which did not include any fibers.

In addition, the absolute values of the dimensional change rates in the longitudinal direction and the transverse direction of the flooring material of Example 2 were 0.06 and 0.07, respectively, and the absolute values of Example 6 were 0.07 and 0.08, respectively. Accordingly, it can be seen that the flooring material of Example 2 had better dimensional stability than that of Example 6.

Although the flooring material of Example 6 had lower dimensional stability than that of Example 2, the flooring material of Example 6 had a lower dimensional change rate than those of Comparative Examples 1 and 2 and had higher dimensional stability than those of Comparative Examples 1 and 2 that did not include any fibers, according to the dimensional change rate, particularly, in the longitudinal direction.

In addition, the flooring material of Example 6 included the fibers dispersed in the flooring material, whereas the flooring material of Comparative Example 3 included the scrim separately manufactured and laminated. Thus, it can be seen that these flooring materials had different components and the flooring material of Example 6 had better dimensional stability than that of the Comparative Example 3.

Thus, it can be seen that the flooring material according to the invention exhibits excellent properties in terms of heat resistance and dimensional stability, and has good strength suitable for application to adhesive type or non-adhesive type flooring materials.

In addition, it can be seen that the method according to the present invention improves dimensional stability of the flooring material.

DESCRIPTION OF REFERENCE NUMERALS

100: Flooring material
110: Fracture surface with respect to longitudinal direction
120: Fracture surface with respect to transverse direction

The invention claimed is:
1. A flooring material, comprising:
a polar plasticizer;
polar fibers comprising aromatic polyamide fibers; and
a thermoplastic resin,
wherein the polar fibers have an alignment,
wherein the polar fibers are present in an amount of 0.1 parts by weight to 10 parts by weight based on 100 parts by weight of the thermoplastic resin,
wherein the polar plasticizer comprises dioctyl terephthalate (DOTP),
wherein the thermoplastic resin comprises polyvinyl chloride (PVC), and
wherein the aromatic polyamide fibers have a diameter of about 2 μm to about 20 μm and a length of about 3 mm to about 50 mm.

2. The flooring material according to claim 1, wherein the plasticizer is present in an amount of 20 parts by weight to 30 parts by weight based on 100 parts by weight of the thermoplastic resin.

3. The flooring material according to claim 1,
wherein the polar fibers further comprises polar inorganic fibers, and
wherein the polar inorganic fibers comprise glass fibers or ceramic fibers.

4. The flooring material according to claim 1, wherein the polar fibers further comprises inorganic fibers having a diameter of about 2 μm to about 6 μm.

5. The flooring material according to claim 1, wherein the polar fibers further comprises inorganic fibers having a length of about 1 mm to about 3 mm.

6. The flooring material according to claim 1, wherein the polar fibers further comprise at least one selected from the group consisting of nylon fibers, polypropylene (PP) fibers, and combinations thereof.

7. The flooring material according to claim 1, further comprising: fillers.

8. The flooring material according to claim 7, wherein the fillers are present in an amount of about 100 parts by weight to about 600 parts by weight based on 100 parts by weight of the thermoplastic resin.

9. The flooring material according to claim 7, wherein the fillers comprise at least one selected from the group consisting of calcium carbonate, talc, fly ash, blast-furnance slag, and combinations thereof.

10. The flooring material according to claim 1, wherein the flooring material has a thickness of about 2 mm to about 7 mm.

11. The flooring material according to claim 1, wherein each strand of the polar fibers is dispersed throughout the thermoplastic resin.

* * * * *